April 3, 1934.   E. L. SCHELLENS   1,953,834
WATER HEATER
Filed Aug. 30, 1930   5 Sheets-Sheet 3

INVENTOR.
Eugene L. Schellens
BY
ATTORNEYS.

April 3, 1934.　　　E. L. SCHELLENS　　　1,953,834
WATER HEATER
Filed Aug. 30, 1930　　　5 Sheets-Sheet 5

INVENTOR.
Eugene L. Schellens
BY
ATTORNEYS.

Patented Apr. 3, 1934

1,953,834

UNITED STATES PATENT OFFICE 1,953,834

WATER HEATER

Eugene L. Schellens, Ridgewood, N. J., assignor to C-S Engineering Company, Englewood, N. J., a corporation of Delaware Application August 30, 1930, Serial No. 478,825

20 Claims. (Cl. 122—434)

This invention relates to water heaters and more particularly to locomotive feed water heaters; and is especially applicable to and useful in connection with heating, and storing heated water, in tenders of locomotives, such an embodiment of the invention being hereinafter disclosed by me.

The invention primarily contemplates, in general: an improved and more efficient utilization of heat given off by a power unit, as for example the heat available in the exhaust of a locomotive, and further the employment of such heat to produce and maintain a supply of heated water for use, as in the locomotive boiler; and, in particular: the heating and storage of feed water in stages, the maintenance of substantially predetermined temperatures in the various stages including the provision of one stage of relatively cold water, the carrying out of the foregoing by the provision of substantially divided or segregated bodies of water from the hotter of which heated water may flow under given circumstances into a cooler body or bodies of the water, the ensuring that water will always be available in proper quantities in the hotter zone or zones even when water in the cooler zone or zones is becoming depleted, the proper venting of the heater or of the chambers thereof, the automatic accomplishment of all the foregoing purposes, and further the attainment of the foregoing in a locomotive tender construction of comparatively simple arrangement and without burdening the locomotive with additional equipment or weight.

More specifically, the invention involves the provision of a divided or chambered heater in the tender, with means for segregating the cold water from the hot water, means for delivering a heating medium (and I contemplate the use of the exhaust from locomotive auxiliaries as well as from the locomotive engine proper) to one of the chambers, means for delivering water, preferably progressively, from the hottest chamber to other chambers and also the reverse, automatic control mechanism which normally permits such flow of cooler water into hotter chambers and under certain given conditions permits flow of hotter water into cooler chambers of the heater.

Other objects and advantages, both as to construction and operation, are also involved, as will be evident, from the following description, to those skilled in the art. The accompanying drawings, illustrating two constructions embodying the various features of the invention, may be described as follows.

Figure 1:
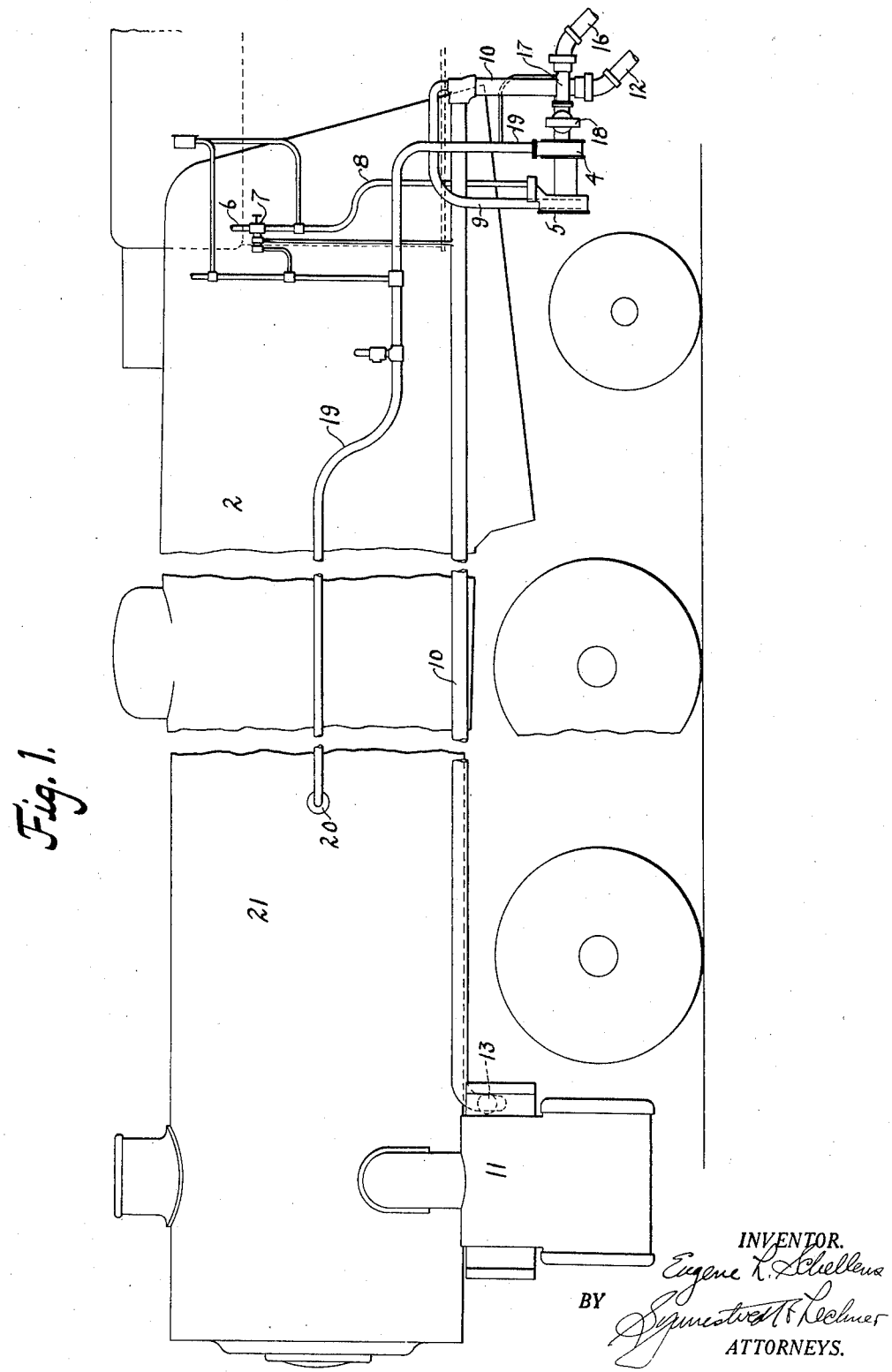
Figure 1 is a somewhat diagrammatic, broken away, side elevational view of the engine of a locomotive embodying my invention.
Figure 2:
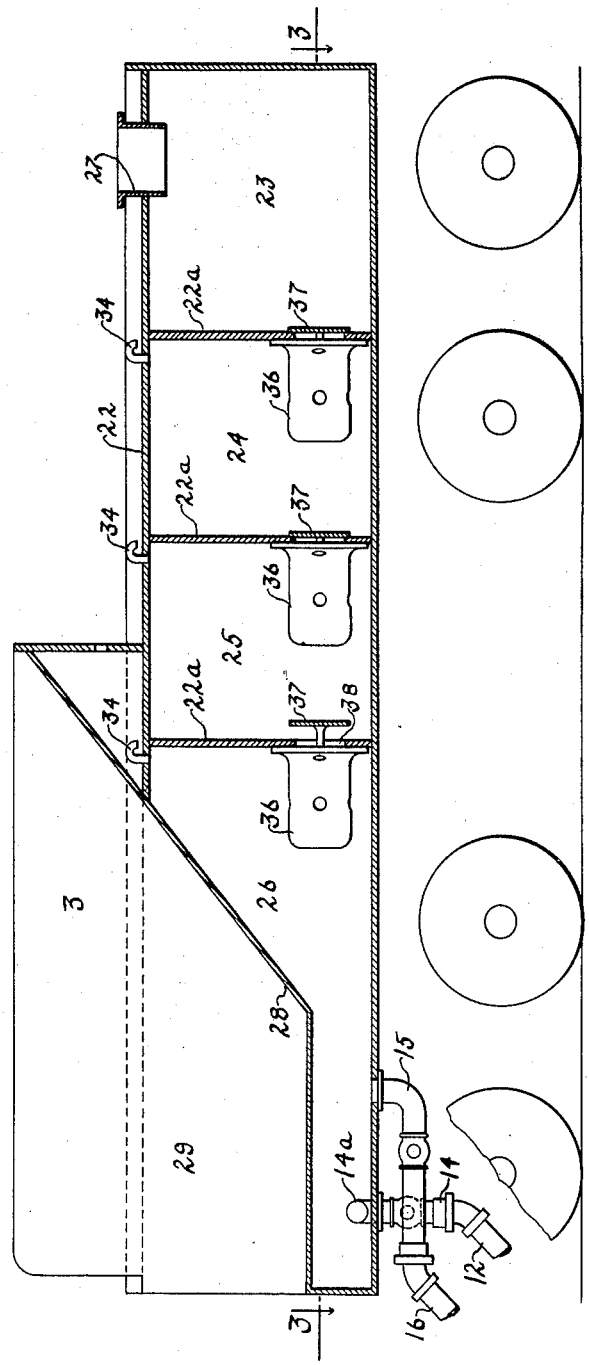
Figure 2 is a vertical, longitudinal mid-section (on line 2—2 of Fig. 3) through the tender of the same locomotive, with certain parts shown in elevation and others diagrammatically, this construction illustrating the use of the tender itself as the heater.
Figure 3:
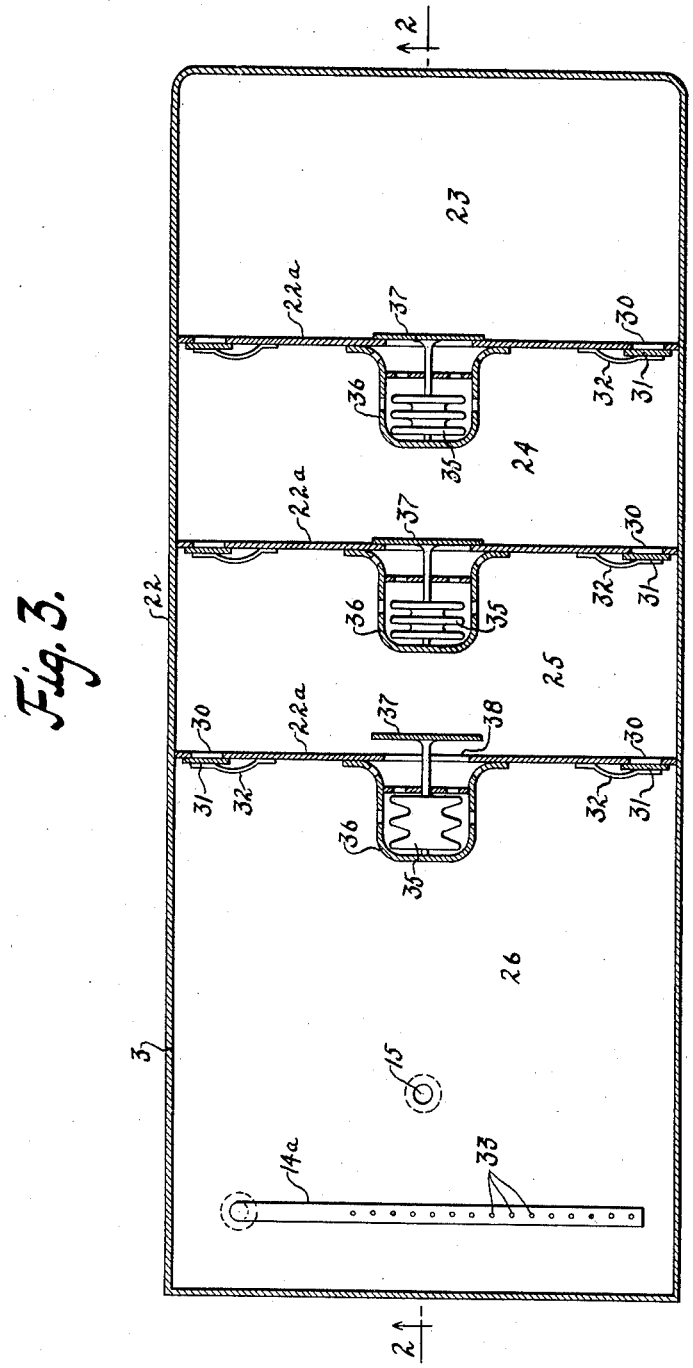
Figure 3 is a horizontal section through the tender of Fig. 2, taken on the line 3—3 thereof.

By reference first to Figs. 1, 2 and 3 of the drawings, it will be seen that I have illustrated a locomotive having an engine 2, and a tender 3 in which I have embodied the present invention. The engine of the locomotive is equipped with a centrifugal water pump 4 driven by a turbine 5, operated by steam, as from a turret (not shown), through pipe 6, valve 7 and pipe 8. The exhaust from the turbine passes, through pipe 9, into main exhaust conduit 10 which leads from the valve chest 11, to the flexible connection 12 between engine and tender.

I thus combine the main engine exhaust and the exhaust of the pump, before passing the same to the tender. Similarly, the exhaust from other locomotive auxiliaries (not shown) may be piped into the main exhaust steam pipe 10 so that it may all be fully utilized in my heater later to be described. A cross-connection 13 may be provided to connect the exhaust cavities of the two valve-chests of the locomotive. Flexible connection 12 is, in turn, coupled to the steam pipe 14 leading to the tender heater. The water connections to the pump 4 are by way of the water outlet or withdrawal pipe 15, flexible connection 16, pipe 17 and strainer 18. Leaving the pump the water passes through pipe 19 and check valve 20 into the boiler 21 of engine 2.

In the construction shown in Figs. 2 and 3, I form the tender tank 22 itself into a multi-stage storage heater by the provision of walls or partitions 22a which divide the water storage space into a plurality of chambers or compartments 23, 24, 25 and 26, the first of these being the cold water compartment into which the usual inlet 27 delivers, and the last of the series being the hottest chamber (as will later appear) from which the outlet 15 leads to the pump.

The final or outlet chamber should be of a capacity small enough to ensure that the water therein will be heated to an appreciable extent by the available waste steam, but not so small that there would not be a stored volume of heated water therein to be drawn upon by the pump at all times. In the disclosure illustrated, while said final chamber (26) is longer than the other chambers, its actual volumetric capacity is not too great, since the coal floor 28 comes well down between the side legs 29 of the tank. It will be seen, especially from Fig. 3, that as the water in chamber 26 is drawn off for use, cooler water from chamber 25 will pass into chamber 26, more or less in surges as the tender moves, through ports 30, flap-valves or gates 31 being provided to substantially prevent reverse flow. These flap or check valves, which are adjacent the tender floor, may be mounted to swing to closed position by gravity, or may in addition to or in substitution for gravity action be provided with yielding springs 32, as shown. Similar ports and valves are also provided to control the flow between chambers 24 and 25, and chambers 23 and 24, and it will be readily understood that the action of the valves, when the tender is in motion and the water is surging back and forth, is to build up the water level in the forward compartment or compartments and insure an adequate head at the outlet even when the total supply is running low. Furthermore, it will be evident that cold water does not flow directly into the final chamber but only indirectly, through stages of the heater.

The heating of the water is accomplished as follows: steam, as from the exhaust line hereinbefore described, passes through pipe 14 into the extension 14a thereof inside chamber 26 of the tender, where it is discharged, preferably directly into the water, adjacent the floor of the tank, as shown, through holes or orifices 33. Air, or excess steam pressure, if any, is vented through the U-pipe or elbow 34 of chamber 26, similar vents being provided for chambers 24 and 25. As the water is heated in chamber 26, it affects the thermostat 35 mounted in the apertured housing or cage 36, such thermostat being shown as being of the expansible fluid-filled diaphragm type, although it will be understood that the particular form of the thermostat is not of importance, and upon a predetermined temperature being attained the thermostat opens the valve 37 which normally closes port 38, thus permitting a controlled flow of water from the hot chamber 26 to the next cooler chamber 25 (a flow normally reverse to the normal flow through ports 30, although some counterflow may also take place). A similar, and preferably independent, arrangement is provided in each of the partition walls 22a, which may be set to operate successively, or serially, at the same or at different temperatures progressively from front to rear of the tender. Thus there is a heating, storage, and delivery of the water by stages, more or less segregated, respectively, and as the water in a compartment is heated, dilution of cooler and hotter water occurs between that and the next adjacent compartment.

Under all conditions of operation, however, the hottest water is in the final, or outlet chamber, and some relatively cold water is maintained in chamber 23, from which it may be drawn for injection into the boiler by the usual injector device (not shown) in case of feed pump failure.

Figure 4:
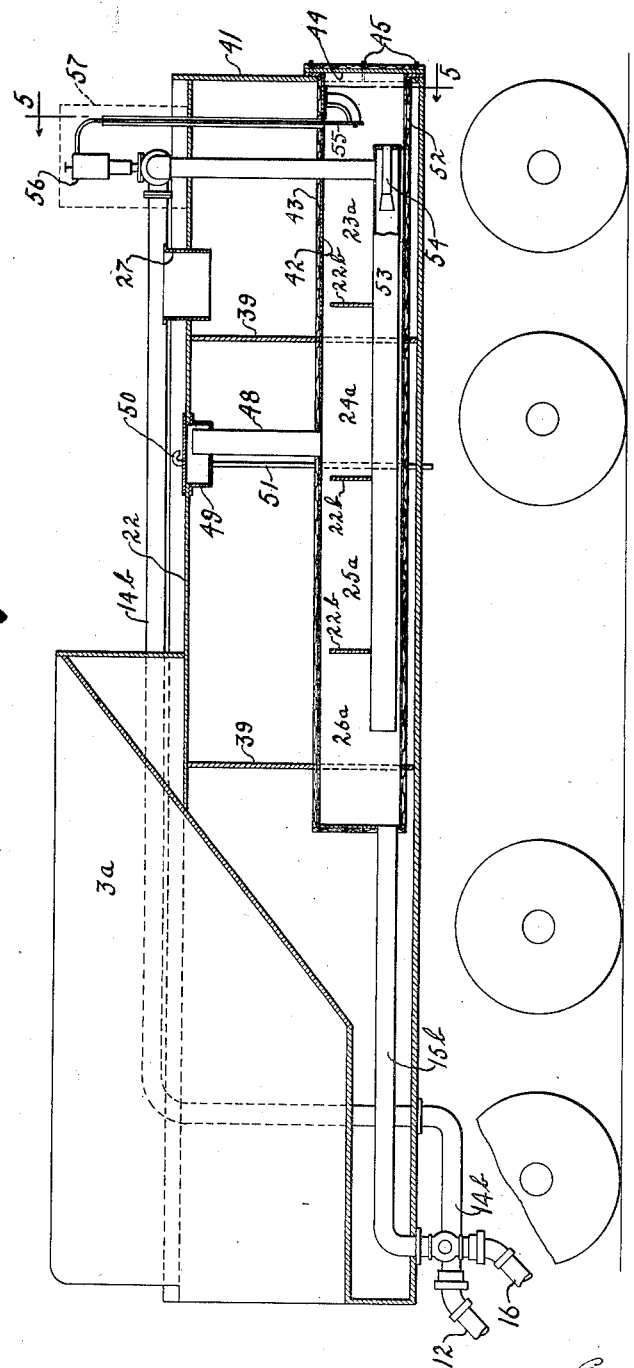
Figure 4 is a longitudinal section, similar to Fig. 2, of a tender construction illustrating a modification of the invention, in which the heater proper is constructed as a separate unit.
Figure 5:
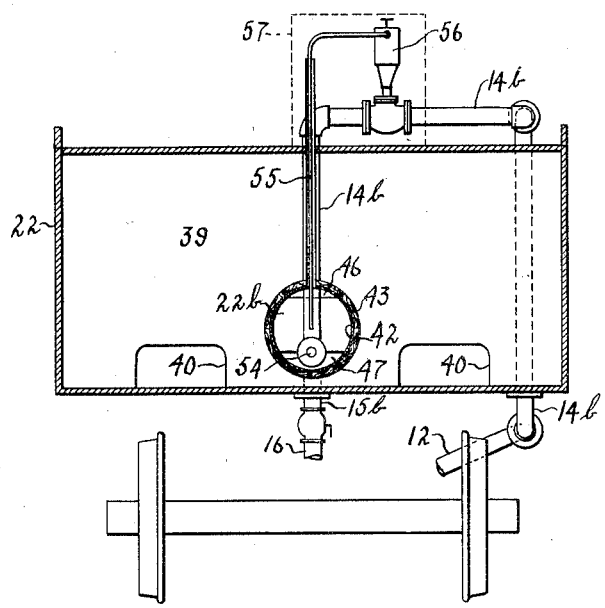
Figure 5 is a transverse section through the tender of Fig. 4, taken on line 5—5 thereof, with certain parts shown in elevation.

Turning now to the modification shown in Figs. 4 and 5, which is particularly well suited for application to tender equipment already built, it will be seen that I have illustrated a tender 3a in which a separate heating unit is employed, the tank 22 itself being not divided to form the chambers of the heater but having simply the usual transverse stiffeners 39, serving as swash-plates, which (as seen in Fig. 5) are provided with clear openings 40 at the bottom for the free passage of water from end to end of the tank. In this construction I use the usual swash-plates 39 and rear plate 41 of the tank as a supporting means for the heater itself, circular, aligned openings being cut through said plates, and the heater being slid in endwise from the rear of the tender.

The heater, in this instance, comprises a tank 42 (here shown as cylindrical) covered by lagging 43, and divided into chambers 23a, 24a, 25a and 26a, as by partitions 22b, the heater itself and its cover 44 being secured in place as by bolts 45. Since the volume of this heater, and consequently the volume and surging of the water therein, is less than that of the heater shown in Figs. 1 to 3, I may dispense with the gate-controlled openings in the partitions and simply provide small clearance spaces 46 and 47 above and below the partitions 22a (as best seen in Fig. 5), which will permit restricted flow from one chamber to another. This arrangement futhermore permits of the use of a single vent for the whole heater, which is here shown as comprising a riser pipe 48, a pocket or chamber 49, a vent 50 from said pocket, and an oil over-flow pipe 51. In addition to venting, this arrangement provides a means of periodically flushing the heater of any oil or other foreign matter which may be carried thereinto, such oil being carried upward on top of the column of water which rises to the top of pipe 48 every time the tender is filled to the top.

Water flows from the main body of water in the tender, into chamber 23a, through port 52. As exhaust steam from connection 12 passes through pipe 14b into tube 53, it draws with it water from chamber 23a by way of the tube or jet-pipe 54. The heated water then passes out the front end of tube 53 into the hottest (outlet) chamber 26a, from which the outlet pipe 15b leads to the connection 16 delivering to the pump. When the pump is not in operation, heated water works back progressively from chamber 26a into the cooler chambers 25a, 24a and 23a. Multi-stage heating and storage of water is thus effected, and when the pump is operated and tends to take up water faster than it is delivered to chamber 26a through jet-pipe 54, there is a return flow from chamber 25a to chamber 26a, and from 24a to 25a, and so on.

In the event of excessive heating of the water all the way back in the heater, the thermostatic device 55, extending downwardly into chamber 23a, expands and opens a relief or steam outlet valve 56 connected into the steam line 14b. A suitable hood 57 (indicated diagrammatically, in dotted lines) may be employed to protect the parts and to blanket or direct the discharge of the discharged steam. I also contemplate the employment of an ordinary shut-off valve in place of the relief valve, in instances where the exhaust of auxiliaries is not piped to the heater, since in such event the pipe 14b can be closed without placing back-pressure on the auxiliaries.

It will now be evident that by my invention I obtain, in a simple and reliable way, the objects and advantages initially set forth herein, and in general that there is provided a multi-stage storage tender heater which is not only simple in construction, and automatic and positive in operation, but which also maintains substantially segregated bodies of cold and hot water for the purposes specified, with progressive heating by intermediate steps, effected, as it were, by dilution, and further that an adequate head of heated water is always maintained in the hot chambers, and, in particular, over the outlet in the final chamber.

What I claim is:—

1. A feed water heater divided into a plurality of water chambers, water delivery means to the heater, means for withdrawing water from the heater, said two means being associated with separate chambers, means for heating the water in one chamber and means whereby water from another chamber may pass relatively freely to the former chamber but not the reverse, together with means, acting under the influence of water temperature conditions, for effecting a transfer of hot water from the hotter to the cooler chamber.

2. A water heater including a plurality of water containing chambers, means for applying heat to the water in a chamber, and means permitting flow of water from a cooler chamber to the heated chamber but restricting opposite flow, together with means, acting under the influence of water temperature conditions, for effecting a transfer of hot water from the hotter to the cooler chamber.

3. A feed water heater divided into a plurality of water chambers, water delivery means to the heater, means for withdrawing water from the heater, said two means being associated with separate chambers, means for heating the water in one chamber and means whereby water from another chamber may pass relatively freely to the former chamber but not the reverse, together with means under the influence of water temperature for permitting a relatively free reverse flow.

4. A water heater including a plurality of water containing chambers, means for applying heat to the water in a chamber, and means permitting flow of water from a cooler chamber to the heated chamber, together with means permitting reverse flow only under predetermined conditions of temperature.

5. A water heater including a plurality of water containing chambers, means for applying heat to the water in a chamber, and means permitting flow of water from a cooler chamber to the heated chamber but restricting opposite flow, together with means permitting reverse flow upon attainment of a predetermined water temperature.

6. A water heater comprising a plurality of hot water storage chambers including a delivery or outlet chamber, means for applying heat to the water in the delivery chamber, and automatic means actuable upon the attainment of a predetermined water temperature in the delivery chamber for diluting relatively cooler water in another storage chamber with water from the delivery chamber.

7. A direct-contact water heater comprising a plurality of hot water storage chambers including a delivery or outlet chamber, means for introducing exhaust steam into the water in the delivery chamber whereby said water is heated and said steam condensed, and temperature-responsive means for automatically progressively passing heated water back from said delivery chamber to other chambers for storage therein.

8. A water heater including a plurality of water containing chambers, means for applying heat to the water in a chamber and means for progressively passing heated water from said chamber to other chambers, together with temperature-influenced means controlling said passage of water.

9. A water heater including a plurality of water containing chambers, means for applying heat to the water in a chamber and means for progressively passing heated water from said chamber to other chambers, together with temperature-influenced means controlling said passage of water independently as to each chamber.

10. A water heater including a plurality of water containing chambers, means for applying heat to the water in a chamber, means operating under the influence of the attainment of a predetermined water temperature for diluting cooler water in another chamber with water from the heated chamber, and a hot water outlet from the heated chamber.

11. A water heater including a plurality of water containing chambers, means for applying heat to the water in a chamber and means for progressively passing heated water from said chamber to other chambers, together with temperature-influenced means controlling said passage of water and a heated water outlet from the hottest chamber.

12. A water heater including a plurality of water containing chambers, means for applying heat to the water in a chamber and means for progressively passing heated water from said chamber to other chambers, together with temperature-influenced means controlling said passage of water independently as to each chamber, and a heated water outlet from the hottest chamber.

13. In a locomotive feed water heater, a series of water chambers, means for delivering steam to the water in a chamber, a water take-off from said chamber, and means whereby water as it is heated may pass serially from said chamber to the other chambers, together with thermostatic means controlling said passage of water.

14. A locomotive tender tank divided into a longitudinal series of chambers, transverse partitions which form the walls between the chambers, a feed water delivery outlet from an end chamber of the tender tank, exhaust-steam heating apparatus arranged to heat the water in the outlet chamber and to heat the water in the other chambers of the series progressively to lesser degrees, whereby the major portion of the tender tank forms a sectional storage heater with different sections at different temperatures, and thermally-responsive water-flow controlling means for controlling the flow between said chambers.

15. A locomotive tender tank having upright partition means dividing the tank into a plurality of water compartments, water heating means in one of said compartments, a feed water delivery outlet for said compartment, and means for transferring water to the outlet compartment through said partition means from another compartment, said water transfer means being operative under the influence of surging of the water in the tank and arranged to oppose transfer of water in the reverse direction, and mechanism providing for flow of water through said partition means in the reverse direction only under certain determinable conditions.

16. A locomotive tender tank having upright partition means dividing the tank into a plurality of water compartments, water heating means in one of said compartments, a feed water delivery outlet for said compartment, and means for transferring water to the outlet compartment through said partition means from another compartment, said water transfer means being operative under the influence of the surging of the water in the tank and arranged to oppose transfer of water in the reverse direction, and thermostatic valve mechanism providing for reverse flow of the water through said partition means upon the attainment of a predetermined water temperature.

17. In a locomotive feed water heater, a series of water chambers including a delivery or outlet chamber, means for delivering steam to the water in said outlet chamber, a water take-off from said outlet chamber, means whereby the water as it is heated may pass serially from said outlet chamber to normally cooler chambers for storage therein, together with thermostatic means under the influence of the relatively coolest chamber and means operable thereby to cut-off the steam supply to the said delivery chamber upon attainment of a predetermined temperature in said coolest chamber.

18. In a direct-contact feed water heater, a pair of nested tubes one of which is a combining tube, means for flowing water and steam through said combining tube in one direction to condense the steam and heat the water, means for flowing the thus heated water through the other tube in the opposite direction, and partitions serving to substantially segregate the water into bodies in the last-mentioned tube for the purpose of progressive heat storage.

19. In a direct-contact feed water heater, a pair of nested tubes one of which is a combining tube, means for flowing water and steam through said combining tube in one direction to condense the steam and heat the water, means for flowing the thus heated water through the other tube in the opposite direction, partitions serving to substantially segregate the water into bodies in the last-mentioned tube for the purpose of progressive heat storage, and a water take-off from the hottest of said bodies of water.

20. A direct-contact water heater comprising a plurality of hot water storage chambers including a delivery or outlet chamber, means, for supplying water to said delivery chamber, means for introducing exhaust steam into the water supplied to the delivery chamber whereby said water is heated and said steam condensed, partition means defining the chambers aforesaid, means providing for serial intercommunication of said chambers, and temperature-responsive means for controlling the flow of water through the means last mentioned back from said delivery chamber to another of said chambers for storage therein.

EUGENE L. SCHELLENS.